(12) United States Patent
Bentley et al.

(10) Patent No.: US 8,560,553 B2
(45) Date of Patent: Oct. 15, 2013

(54) MULTIMEDIA DEVICE FOR PROVIDING ACCESS TO MEDIA CONTENT

(75) Inventors: Frank R. Bentley, Palatine, IL (US); Gunnar F. Harboe, Schaumburg, IL (US); Crysta J. Metcalf, Cary, IL (US); Guy G. Romano, Elmhurst, IL (US); Vivek V. Thakkar, Elk Grove Village, IL (US)

(73) Assignee: Motorola Mobility LLC, Libertyville, IL (US)

( * ) Notice: Subject to any disclaimer, the term of this patent is extended or adjusted under 35 U.S.C. 154(b) by 2 days.

(21) Appl. No.: 11/470,459

(22) Filed: Sep. 6, 2006

(65) Prior Publication Data

US 2008/0060014 A1   Mar. 6, 2008

(51) Int. Cl.
*G06F 7/00* (2006.01)
*G06F 17/30* (2006.01)

(52) U.S. Cl.
USPC ............................ 707/748; 707/899; 707/916

(58) Field of Classification Search
USPC ......... 707/104.1, 736, 748, 751, 913; 725/37, 725/52, 53; 705/26; 709/228
See application file for complete search history.

(56) References Cited

U.S. PATENT DOCUMENTS

| | | | |
|---|---|---|---|
| 6,526,411 B1 * | 2/2003 | Ward | 1/1 |
| 6,748,395 B1 * | 6/2004 | Picker et al. | 707/102 |
| 7,000,188 B1 * | 2/2006 | Eustace | 715/716 |
| 7,321,923 B1 * | 1/2008 | Rosenberg et al. | 709/217 |
| 7,840,289 B2 * | 11/2010 | Buil et al. | 700/94 |
| 8,332,895 B2 * | 12/2012 | Nathan et al. | 725/61 |
| 2002/0045960 A1 * | 4/2002 | Phillips et al. | 700/94 |
| 2002/0138630 A1 | 9/2002 | Solomon et al. | |
| 2003/0089218 A1 | 5/2003 | Gang et al. | |
| 2003/0135513 A1 * | 7/2003 | Quinn et al. | 707/102 |
| 2003/0236582 A1 * | 12/2003 | Zamir et al. | 700/94 |
| 2004/0131333 A1 | 7/2004 | Fung et al. | |
| 2004/0237759 A1 | 12/2004 | Bill | |
| 2005/0038819 A1 * | 2/2005 | Hicken et al. | 707/104.1 |
| 2005/0098023 A1 * | 5/2005 | Toivonen et al. | 84/615 |
| 2005/0102186 A1 | 5/2005 | Buil | |
| 2006/0107822 A1 * | 5/2006 | Bowen | 84/612 |

(Continued)

FOREIGN PATENT DOCUMENTS

WO   WO 2006/063447   *   6/2006

OTHER PUBLICATIONS

Musescape: A Tool for Changing Music Collections into Libraries, George Tzanetakis, ECDL 2003, published 2003.*

(Continued)

*Primary Examiner* — Jeffrey A Burke (57) ABSTRACT

A multimedia device and a method embodied in the multimedia device for providing access to media content from a plurality of media content are provided. The multimedia device includes a user interface (UI) with one or more UI controls, a processor, and an output device. The UI controls receive a first set of parameter values from the user, in order to select media content. The processor creates a first list of media content based on a first probabilistic distribution over the plurality of media content. The output device provides access to the media content of the first list of media content to the user. Further, the UI may receive a second set of parameter values, and a second list of media content is then created, based on a second probabilistic distribution. The output device provides access to the media content of the second list of media content to the user.

23 Claims, 4 Drawing Sheets

(56) References Cited

U.S. PATENT DOCUMENTS

| | | | |
|---|---|---|---|
| 2006/0112143 A1* | 5/2006 | Subramanian | 707/104.1 |
| 2006/0143236 A1* | 6/2006 | Wu | 707/104.1 |
| 2006/0143647 A1* | 6/2006 | Bill | 725/10 |
| 2006/0195516 A1* | 8/2006 | Beaupre | 709/203 |
| 2006/0206478 A1* | 9/2006 | Glaser et al. | 707/5 |
| 2006/0212442 A1* | 9/2006 | Conrad et al. | 707/5 |
| 2006/0224259 A1* | 10/2006 | Buil et al. | 700/94 |
| 2006/0242661 A1* | 10/2006 | Bodlaender et al. | 725/9 |
| 2006/0253874 A1* | 11/2006 | Stark et al. | 725/62 |
| 2006/0265421 A1* | 11/2006 | Ranasinghe et al. | 707/104.1 |
| 2006/0288845 A1* | 12/2006 | Gale | 84/609 |
| 2007/0025194 A1* | 2/2007 | Morse et al. | 369/30.1 |
| 2007/0078895 A1* | 4/2007 | Hsieh et al. | 707/104.1 |
| 2007/0204227 A1* | 8/2007 | Kretz | 715/727 |
| 2007/0220552 A1* | 9/2007 | Juster et al. | 725/46 |
| 2008/0022846 A1* | 1/2008 | Samadani et al. | 84/610 |
| 2008/0256032 A1* | 10/2008 | Vignoli et al. | 707/3 |

OTHER PUBLICATIONS

"iPod 101 Crank Up the Tunes", http://www.apple.com/support/ipod101/tunes/, Feb. 15, 2006.

* cited by examiner

MULTIMEDIA DEVICE FOR PROVIDING ACCESS TO MEDIA CONTENT

FIELD OF THE INVENTION

The present invention relates generally to the field of multimedia devices, and specifically, to providing access to media content in multimedia devices.

BACKGROUND OF THE INVENTION

With the advancement in technology, there have been phenomenal changes in the design and usage of multimedia devices. Multimedia devices provide access to a variety of media content, which can be stored on the multimedia device or on another device interfaced with the multimedia device. The media content can be audio files, video files, graphic files, animation files, or text files. Providing access to media content stored on a multimedia device gives users the option of playing, viewing, sharing or sending the media content.

Currently, users with large collections of media files can spend an inordinate amount of time attempting to select the appropriate content. Very often, users are not sure about the exact nature of media content they want to access, but rather have just a vague idea about the kind of media content they are interested in. Thus, precise queries or static hierarchies are often insufficient for a user's real needs. While some multimedia devices have tried to solve the time-consuming nature of media searches by providing users with the option of selecting various criteria, these devices still require users to explicitly select a criterion and thus do not solve the problems associated with exact queries. For example, users can only specify that they want to access content with a particular title, from a particular singer, from a specific album, or from a specific genre, and the like. Users of these systems have no way to express that they want content that is faster, slower, older, newer, or the like, which are often the ways that the users are thinking about the content. As a result, the user may not be satisfied with the media content that is provided by the multimedia device.

Hence, there is a need for a multimedia device that simplifies the selection of media content for a user. The multimedia device should provide a particular type of media content to the user rather than particular media content. Further, there is a need for the multimedia device to make a broad selection of media content possible, without providing only specific media content and without being overly broad so that the selection is not random.

BRIEF DESCRIPTION OF THE FIGURES

The present invention is illustrated by way of example, and not limitation, in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated, relative to other elements, to help to improve an understanding of embodiments of the present invention.

DETAILED DESCRIPTION OF THE EMBODIMENTS

Before describing in detail the particular multimedia device for providing access to media content, in accordance with the present invention, it should be observed that the present invention resides primarily in combinations of method steps and apparatus components related to providing access to the media content stored in the multimedia device. Accordingly, the apparatus components and method steps have been represented where appropriate by conventional symbols in the drawings, showing only those specific details that are pertinent for understanding the present invention, so as not to obscure the disclosure with details that will be readily apparent to those with ordinary skill in the art, having the benefit of the description herein.

In this document, relational terms such as first and second, and the like, may be used solely to distinguish one entity or action from another entity or action, without necessarily requiring or implying any such actual relationship or order between such entities or actions. The terms "comprises," "comprising", or any other variation thereof, are intended to cover a non-exclusive inclusion, such that a process, method, article, or apparatus that comprises a list of elements does not include only those elements but may include other elements not expressly listed or inherent to such a process, method, article or apparatus. An element preceded by "comprises . . . a" or "comprising . . . a" does not, without more constraints, preclude the existence of additional identical elements in the process, method, article or apparatus that comprises the element.

A "set", as used in this document, means a non-empty set (i.e., comprising at least one member). The term "another", as used herein, is defined as at least a second or more. The terms "including" and/or "having", as used herein, are defined as comprising. A "list," as used in this document, means an enumeration of content items. This enumeration may be empty, contain one or more ordered items, or be infinite in length. Items may be repeated, i.e. occur in two or more different positions in the list.

For one embodiment, the present invention is a multimedia device that provides access to media content from a plurality of media content stored on it. The multimedia device includes a user interface (UI) with a one or more UI controls, a processor, and an output device. The one or more UI controls are configured to receive a first set of parameters from the user, in order to select media content. The processor creates a first list of media content from the plurality of media content, based on the first set of parameters from the user. The output device provides access to media content of the first list of media content. If the user modifies a parameter of the UI controls, the processor further creates a second list of media content based on the second set of parameters from the user. The output device provides access to media content of the second list of media content. The creation of the first list of media content is based on a first probabilistic distribution of the plurality of media content, where the first probabilistic distribution is based on the first set of parameters. Similarly, the creation of the second list of media content is based on a second probabilistic distribution of the plurality of media content and the second probabilistic distribution is based on the second set of parameters.

Figure 1:
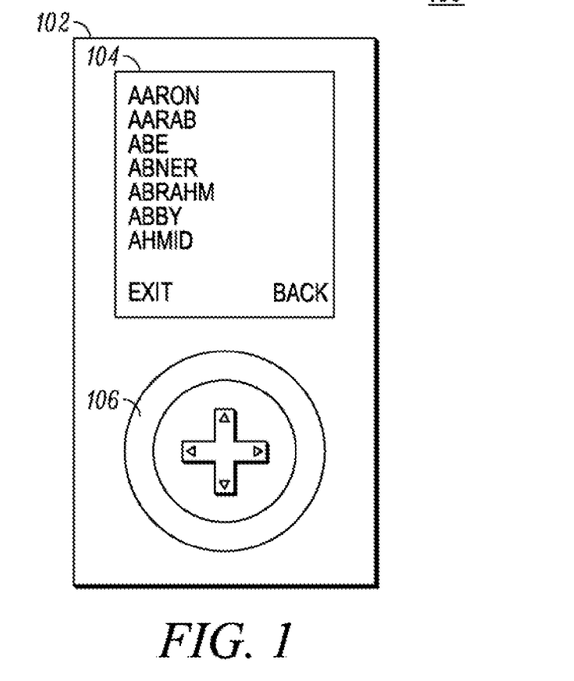
FIG. 1 illustrates an exemplary multimedia device, in accordance with the present invention.

For another embodiment, the present invention provides a method for managing a multimedia device. The method includes receiving a first set of parameters from a set of user interface (UI) controls of the multimedia device. The method further includes creating a first list of media content based on the first set of parameters. The method further provides access to media content of the first list of media content. Again, if the one or more UI controls are modified to a second set of parameters, the multimedia device creates a second list of media content while providing access to the media content of the first list of media content. The multimedia device creates a second list of media content based on a second probabilistic distribution. The probabilistic distribution is based on the second set of parameters from the user FIG. 1 illustrates an exemplary multimedia device 100, in accordance with the present invention. The multimedia device 100 includes a housing 102, a display 104, a user interface (UI) 106. It will be apparent to a person skilled in the art that the multimedia device 100 shown in FIG. 1 is for exemplary purposes only and can have other structures or appearances. For one embodiment of the present invention, the multimedia device 100 stores a plurality of media content and provides access to the media content via the display 104. Providing access to media content stored on a multimedia device gives users the option of playing, viewing, sharing or sending the media content. For example, for this embodiment, the multimedia device 100 can include, but is not limited to, a picture viewer, a graphic viewer, an animation viewer and a text viewer. For another embodiment, the multimedia device 100 can include, but is not limited to, a music player and a video player. For this embodiment, the plurality of media content includes, but is not limited to, music files and video files. The multimedia device 100 can provide access with external or internal components that include, but are not limited to, a pair of headphones, a pair of earphones and loudspeaker. For another embodiment of the present invention, the multimedia device 100 can access the plurality of media content from a storing device and provide access to the media content of the plurality of media content. The UI interface 106 includes one or more UI controls. Examples of the one or more UI controls include, but are not limited to, a touch screen, a button, a dial, a knob, a slider, an adjustable GUI widget and a keypad. The one or more UI controls are configured to receive a set of parameters from a user, and the multimedia device 100 processes the set of parameters and creates a list of media content based on the set of parameters.

Figure 2:
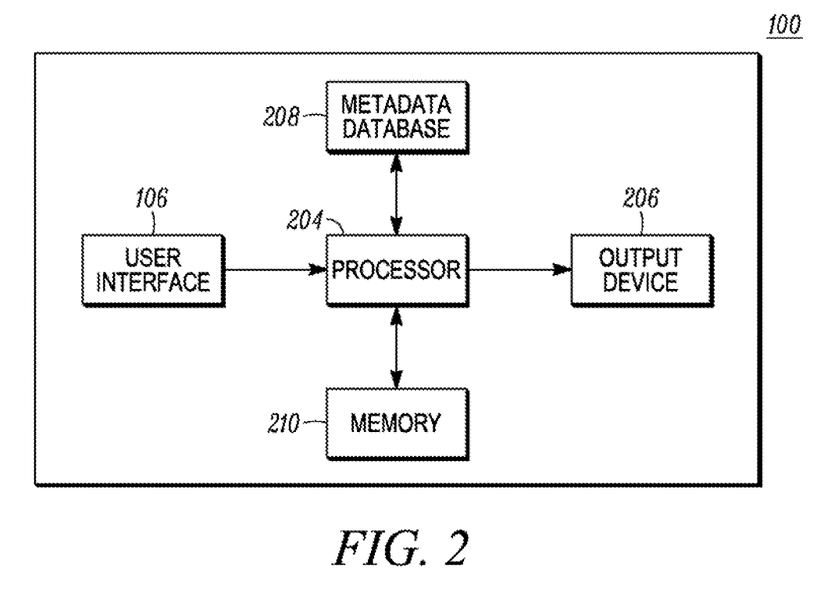
FIG. 2 is a block diagram illustrating various elements of a multimedia device, in accordance with the present invention.

FIG. 2 is a block diagram illustrating various elements of a multimedia device 100, in accordance with the present invention. The multimedia device 100 includes a user interface (UI) 106, a processor 204, an output device 206, a metadata database 208, and a memory 210. The UI 106 is configured to receive the set of parameters for selecting media content. The set of parameters are chosen to reflect the user's desire for particular media content. The UI 106 is described further in conjunction with FIG. 3. The processor 204 is configured to create a list of media content from the plurality of media content. The processor 204 creates a probabilistic distribution of the plurality of media content based on the set of parameters. The probabilistic distribution includes a set of probabilistic values for each of the plurality of media content. For an embodiment, the probability of a media content to be selected in the list of media content is higher if its corresponding probabilistic value is higher. For another embodiment, each metadata attribute of media content is assigned a probability value. Thereafter, the list of media content is created based on the probabilistic distribution, created in response to the set of parameters. The operation of the processor 204 is further described in conjunction with FIG. 4. The multimedia device operates in real time and creates a new list of media content each time the set of parameters is changed by the user. For example, let the set of parameters be a first set of parameters initially, and a list of media content created by the multimedia device be a first list of media content. When the set of parameters is changed by the user, for example to a second set of parameters, the multimedia device correspondingly creates a second list of media content in real time.

The metadata database 208 stores a set of metadata attributes given the fact that all media content will have metadata attributes associated with them. These metadata attributes can include, but are not limited to, static media-content information, analytical media-content information, usage media-content information, user-rated media-content information, externally gathered media-content information, collaboratively filtered media-content information, and contextual media-content information. The static media-content information includes basic information about media content. For example, the basic information about the music type of media content includes, but is not limited to, the name of the artist, the album, the track number, and the genre. The analytical media content information includes the information that can be extracted from the media content by analysis. For example, the analytical media-content information includes, but is not limited to, beats per minute (bpm) and vocal/instrumental for music type of media content. Usage media-content information includes information such as first acquired, last played and the number of times played. User-rated media-content information includes information assigned by the user to the plurality of media content. Examples of user-rated media-content information include, but are not limited to, user rating, number of times the user repeats the media content, number of times the user skips a media content and user-defined genre. Externally gathered media-content information can include information such as lyrics, or any other data retrieved from separate databases. Collaboratively filtered media-content information can include, but is not limited to, information about preferences that is inferred from comparisons with other people. The contextual information includes information such as the time of day and the location. The memory 210 stores the plurality of media content electronically. For an embodiment of the present invention, the multimedia device 100 accesses the plurality of media content from another device, which stores the plurality of media content and is interfaced with the multimedia device 100.

Figure 3:
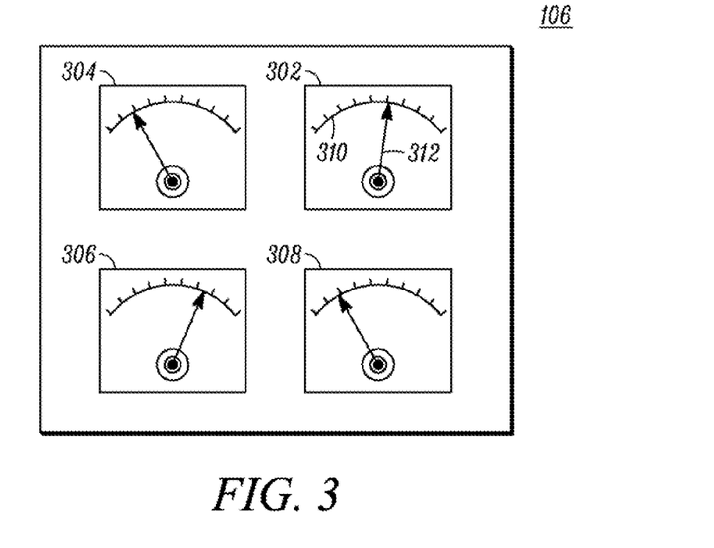
FIG. 3 is a block diagram illustrating a user interface of the multimedia device, in accordance with the present invention.

FIG. 3 is a block diagram illustrating a user interface 106 of the multimedia device 100, in accordance with the present invention. The user interface 106 has one or more UI controls that include a dial 302, a dial 304, a dial 306, and a dial 308. It will be apparent to a person ordinarily skilled in the art that dials 302, 304, 306 and 308, are shown for exemplary purposes only, and the multimedia device 100 can include any number of dials apart from those shown. The dial 302 includes a scale 310 and a pointer 312. The scale 310 is calibrated in terms of a particular metadata attribute and includes a plurality of marked values of the particular metadata attribute. The pointer 312 is controlled by the user. Position of the pointer 312 on the scale 310 assigns a value to a metadata attribute that is associated with the dial 302. In other words, a state of the dial 310 gives a value to the associated metadata attribute and when the state of the dial 310 is changed by changing the position of the pointer 312 on the scale 310, a value assigned to the metadata attribute is changed.

Each of the dials 302, 304, 306 and 308 is associated with a metadata attribute or a composition of metadata attributes. For example, a metadata attribute can be a measure of recently acquired media content, which represents the date at which each media item was acquired. Similarly, other metadata attributes can be a measure of recently played/viewed media content, the origin of particular media content, and the measure of the similarity of specific media content to currently playing/displayed media content, or the date a media item was created/published. It will be apparent to a person skilled in the art that the dials 302, 304, 306 and 308 can also be attributed to other metadata attributes. For one embodiment, the user interface 106 includes a UI control, which operates in a dual-mode. In the dual mode, the UI control is associated with each of the metadata attributes of the set of metadata attributes. For this embodiment, the UI control and the set of metadata attributes can be associated such that by depressing and turning the UI control, a particular metadata attribute is chosen and by turning the UI control in the non-depressed state, the value of metadata attribute is given. In one alternate embodiment, one or more UI controls could be fixed to particular metadata attributes and each UI control could be turned to select a value for the pre-assigned attribute or combination of attributes.

Figure 4:
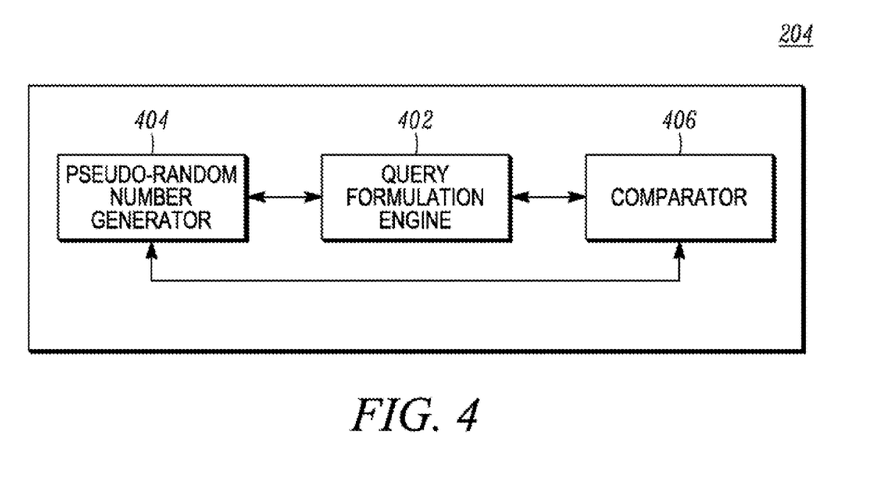
FIG. 4 is a block diagram illustrating a processor of the multimedia device, in accordance with the present invention.

The multimedia device 100 receives a user parameter in terms of the position of the pointer 312 on the scale 310. UI 106 is shown in FIG. 3 is for exemplary purposes only. It will be obvious to a person skilled in the art that the UI 202 can include, but is not limited to, a plurality of other user interface controls such as a button, a knob, a slider, or any adjustable Graphical User Interface (GUI) widget FIG. 4 is a block diagram illustrating the processor 204 of the multimedia device, in accordance with the present invention. The processor 204 includes a query formulation engine (QFE) 402, a pseudo-random number generator 404, and a comparator 406. The QFE 402 receives a set of parameters and generates a query in the metadata database 208. The QFE 402 determines the probabilistic distribution for the set of parameters. The QFE 402 determines the probabilistic distribution of media content, based on the set of parameters in real time. For example, the query-formulation engine 402 determines a first probabilistic distribution when it receives the user's first set of parameters. Thereafter, when the QFE 402 receives the user's second set of parameters, it changes the first probabilistic distribution to a second probabilistic distribution, based on the second set of parameters. It will be apparent to a person ordinarily skilled in the art that first and second set of parameters are described for exemplary purposes only, and the user can specify any number of sets of parameters. The probabilistic distribution of media content is then varied accordingly. The probabilistic distribution includes a set of probabilistic values for each of the plurality of media content. For one embodiment of the present invention, the higher probabilistic value of specific media content for a particular set of parameters signifies a higher probability of it being selected in the list of media content.

For one embodiment, the determination of the probabilistic distribution can be explained by using the following mathematical representation:

$$f:(C,I) \mapsto D \quad (1)$$

Where C is the collection of the plurality of media contents and I is the information about metadata attributes. The function f takes C and I as inputs and determines a probabilistic distribution based on the set of parameters. The probabilistic distribution is represented by D. The information I can include, but is not limited to, static media content information, analytical media content information, usage media content information, user rated media content information, externally gathered media-content information, collaboratively filtered media-content information, and contextual media-content information. The set of metadata attributes as well as the set of parameters determined by change in the position of the pointer 312 can be used to control the function f, and the probabilistic distribution D can be determined by varying function f. The list of media content is created, based on the probabilistic distribution D, and is further defined in conjunction with FIG. 6.

The pseudo-random number-generator 404 generates a set of pseudo-random numbers. Typically, the cardinality of the set of pseudo-random numbers is the desired number of media content in the list of the media content. The value of each of the set of pseudo-random numbers lies between zero and one. The comparator 406 compares each of the set of pseudo-random numbers to the probabilistic distribution of the set of parameters. The QFE 402 creates a list of the media content, based on the comparison.

Figure 5:
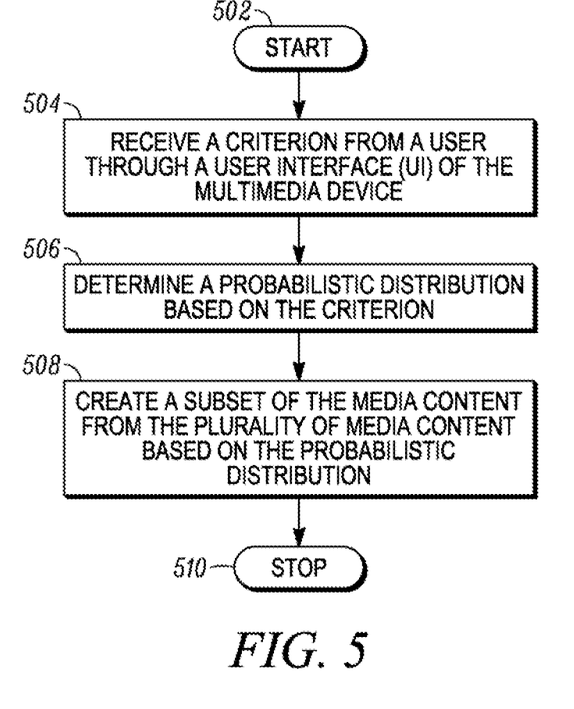
FIG. 5 illustrates a flow diagram for providing access to a media content stored in the multimedia device, in accordance with the present invention.

FIG. 5 illustrates a flow diagram for providing access to media content stored in the multimedia device 100, in accordance with the present invention. After initiating the process at step 502, the set of parameters is received through the UI 106 of the multimedia device 100 at step 504. At step 506, a probabilistic distribution based on the set of parameters is determined. At step 508, the list of media content is created, based on the probabilistic distribution D, and is further described in conjunction with FIG. 6. Thereafter, the process terminates at step 510.

Figure 6:
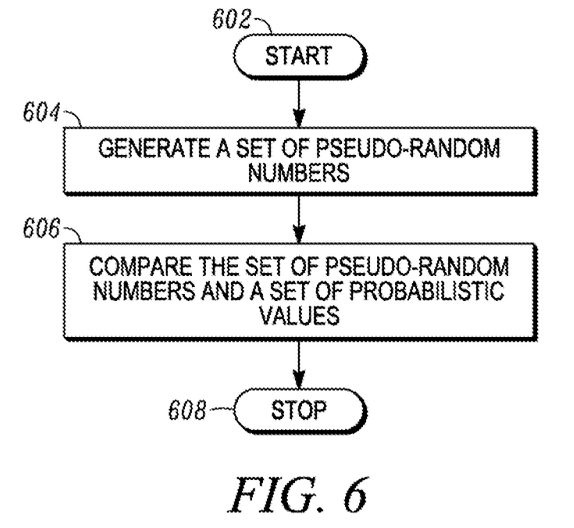
FIG. 6 illustrates a flow diagram for creating a list of media content from a plurality of media content, in accordance with the present invention.

FIG. 6 illustrates a flow diagram for creating a list of media content from a plurality of media content, in accordance with the present invention. For one embodiment of the present invention, creating a list of media content can be explained by the following mathematical representation. Let the plurality of media content be represented by a set $C=\{O_1, O_2 \ldots O_N\}$. Let the plurality of media content include N pieces of media content and $O_i$ denote the $i^{th}$ media content of the plurality of media content. The order of media content can be arbitrary in the set C. For one embodiment of the present invention, the probabilistic distribution function D defines the set of probabilistic values of each of the plurality of media content. Let D be represented by $\{D_1, D_2 \ldots D_N\}$. At step 602, the process of creating a list $L=\{L_1, L_2, \ldots, L_n\}$ of media content from a plurality of media content is initiated. For one embodiment of the present invention, the number of media content in the list of media content (n) can be set by the user. At step 604, a set of pseudo-random numbers is generated. The cardinality of the set of pseudo-random numbers is the number of media content in the list of media content (n). Let the set of pseudo-random numbers be represented by $R=\{R_1, R_2, \ldots R_n\}$ and let each element of the set of pseudo-random numbers lie in the range of [0, 1]. At step 606, each of the set of pseudo-random numbers is compared to the probabilistic distribution D. The list of the media content is created, based on the comparison between the set of pseudo-random numbers and the probabilistic distribution D. For one embodiment of the present invention, a first media content $L_1=O_i$ for the list of the media content is selected, such that $$D(O_i) > R_1 \text{ and} \quad (2)$$

$$D(O_{i\text{-}i}) < R_1, \text{ unless } i \text{ is } 1 \quad (3)$$

The equations 2 and 3 are repeated for each random number up to $R_n$, and a list of media content is created. Thereafter, the process terminates at step 608. One skilled in the art will readily see how to extend this method to allow the probabilistic values of each media content to be modified between selecting successive entries on the list, and to continuously select more entries for a list of unlimited length, and these techniques are also included in the invention.

Figure 7:
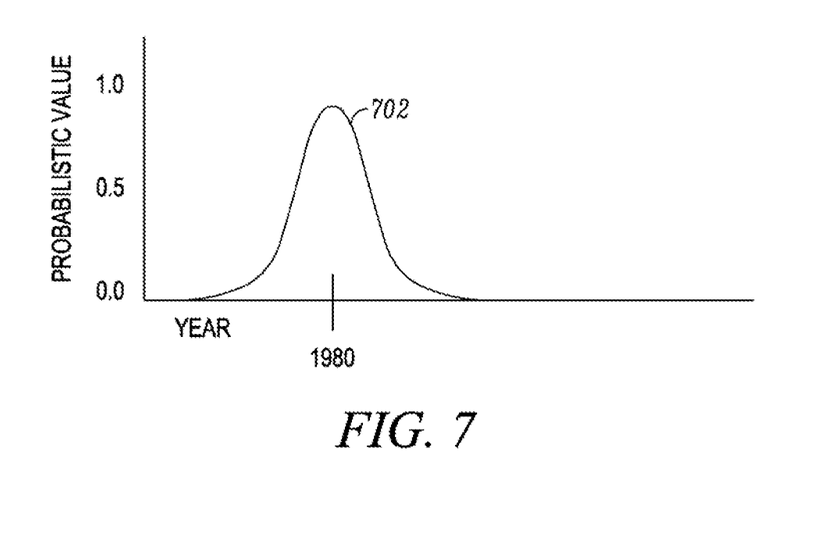
FIGS. 7 and 8 illustrate graphs representing probabilistic distributions, based on parameters, in accordance with the present invention.
Figure 8:
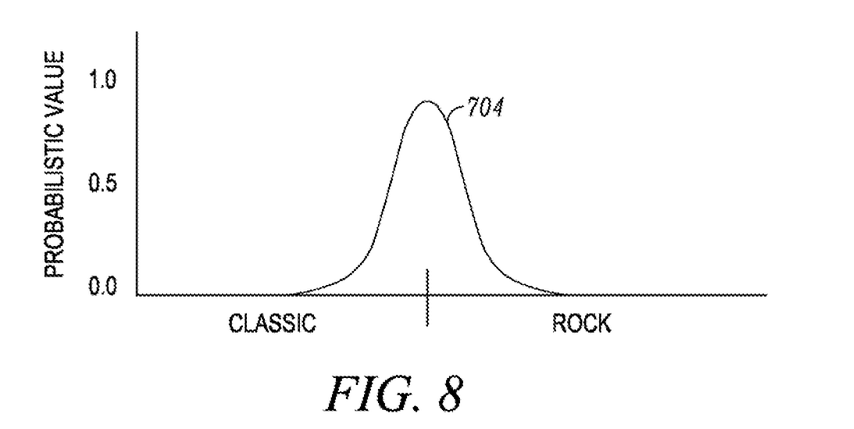

FIGS. 7 and 8 illustrate graphs representing probabilistic distributions, based on the set of parameters, in accordance with an embodiment of the present invention. FIGS. 7 and 8 include a curve 702 and a curve 704. The curve 702 represents the probabilistic distribution when the set of parameters is the media content belonging to the year 1980. Again, the interest of the user is such that the user is also satisfied with the media content related to the years in close proximity to 1980, such as media content belonging to the pre-1980 and the post-1980 periods. A list of media content is created, based on the probabilistic distribution of the curve 702. It is obvious from the curve 702 that the probabilistic value of media content belonging to the year 1980 is more than the probabilistic value of media content belonging to pre-1980 and post-1980 periods. Therefore, most of the media content of the list of media content includes media content related to the year 1980. The list of media content also includes media content from the pre-1980 and post-1980 periods, but less than the media content related to the year 1980. In other words, the maximum number of media content is from year 1980, next maximum from one of year 1981, 1979 and after that from year 1982 and 1978 so on and so forth. Similarly, the curve 704 represents the probabilistic distribution when the set of parameters specifies media content that is similar to classical type of music media content and the rock type of music media content. The list of media content that is created based on the probabilistic distribution includes the music files which fall in the category of classical type or rock type of music. For another embodiment of the present invention, the multimedia device can receive multiple sets of parameters from the user. The multimedia device can use the intersection of the probabilistic distribution corresponding to each of the multiple sets of parameters, and create a list of the media content.

The probabilistic distribution includes a set of probabilistic values for each of the plurality of media content. These probabilistic values can be varied by changing the set of parameters. For example, let the set of parameters include a parameter $\alpha$. It can be varied in the range [0, 1] by the user by turning a dial. Let the turning of the dial be associated with a metadata attribute where the metadata attribute is the time at which media content has been last accessed. For one embodiment of the present invention, the probabilistic value of the media content of the plurality of media content can be computed with the following equation:

$$P(O_i) = \frac{\alpha\left(\frac{1}{t - t_i}\right) + (1 - \alpha)}{\sum_{n \in N} \alpha\left(\frac{1}{t - t_n}\right) + (1 - \alpha)} \quad (4)$$

where $t_i$ is the time at which media content $O_i$ was last accessed. When the value of $\alpha$ is 1, the probabilistic value of the media content is inversely proportional to the time since it was last accessed. Conversely, the probabilistic distribution is uniform when the value of $\alpha$ is 0. The value of $\alpha$ can be controlled by the user according to his choice by varying the position of the pointer 312. The corresponding probabilistic distribution is determined, based on computing the probabilistic values of each of the plurality of media content with the help of equation (4). Thereafter, the list of media content desired by the user is created. Again, let $\alpha$ be related to a metadata attribute where the metadata attribute is the similarity between two media objects of the plurality of media objects. The similarity between two media objects can be measured in terms of certain assumptions. For example, it can be assumed that two songs by the same artist are more similar than two songs by two different artists. Similarly, similarity can also be defined between the media content of two different genres. For example, rock music can be assumed to be more similar to 'alternative rock' than to jazz. Similarly, similarity can also be assumed, based on the rhythm, the tempo, the key, and other characteristics of sound. Let $S(O_i, O_j)$ denote the similarity between the $i^{th}$ media object and the $j^{th}$ media object of the plurality of media objects. The probabilistic value of the $i^{th}$ media object, with respect to the similarity to the $j^{th}$ media object, can be computed with the help of the following equation:

$$Q(O_i) = S(O_i, O_0)^{N\alpha} \quad (5)$$

$$P(O_i) = \frac{Q(O_i)}{\sum_{n \in N} Q(O_n)} \quad (6)$$

Where, Q is a convenience function; and
$O_0$ is a reference media object against which each of the media objects is compared. The selection of the reference media object can be controlled by the user. Typically, the reference media object is the currently accessed media object. Similarly, there can be other possible parameters such as $\beta$, $\lambda$, ... that are associated with the other similar dials or other user interface controls in the UI.

Various embodiments of the present invention provide multiple functionalities. The multimedia device allows users to select media content with minimal effort by means of a sliding bar, by turning a dial, or by using other user interfaces. The multimedia device is flexible in choosing the metadata attributes and can be set for a balance between a random selection and a biased selection in selecting the media content. More specifically, the multimedia device can be used for audio, video, text, animations and graphics.

It will be appreciated that the processor described herein may be comprised of one or more conventional processors and unique stored program instructions that control the one or more processors to implement, in conjunction with certain non-processor circuits, some, most, or all of the functions of the processor described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

What is claimed is:

1. A multimedia device for providing access to media content and storing a plurality of media content, the multimedia device comprising:
   a user interface (UI) comprising one or more UI controls associated with at least one metadata attribute of a set of metadata attributes and configured to receive a first set of parameters relating to the at least one metadata attribute for selecting the media content, wherein the first set of parameters is received in terms of a position on a scale associated with the at least one metadata attribute, further wherein the at least one metadata attribute is objectively-based;
   a processor configured to create a first list of media content from the plurality of media content based on a first probabilistic distribution over the plurality of media content, wherein the first probabilistic distribution is based only on the first set of parameters and the plurality of media content; and
   an output device configured to provide access to media content, wherein the media content is initially selected from the first list of media content;
   wherein the processor, in response to receiving a second set of parameters at the UI while the output device is providing access to the media content, creates a second list of media content from the plurality of media content based on a second probabilistic distribution over the plurality of media content, and wherein the second probabilistic distribution is based only on the second set of parameters and the plurality of media content.

2. The multimedia device as recited in claim 1, wherein the UI is at least one of a touch screen, a dial, a button, a knob, a slider and an adjustable Graphical User Interface (GUI) widget.

3. The multimedia device as recited in claim 1, wherein changing a state of a UI control assigns a value to an associated metadata attribute.

4. The multimedia device as recited in claim 1, wherein a UI control from the one or more UI controls operates in a dual-mode, wherein the UI control is associated with each of the set of metadata attributes in the dual-mode.

5. The multimedia device as recited in claim 1, wherein the processor comprises:
   a query formulation engine for determining one of the first probabilistic distribution and the second probabilistic distribution; and
   a pseudo-random number generator for generating a set of pseudo-random numbers.

6. The multimedia device as recited in claim 1, wherein the first probabilistic distribution includes a first set of probabilistic values for the plurality of media content, and wherein the second probabilistic distribution includes a second set of probabilistic values for the plurality of media content.

7. The multimedia device as recited in claim 6, wherein the processor further comprises a comparator for comparing each pseudo-random number of the set of pseudo-random numbers to one of the first set of probabilistic values and second set of probabilistic values for each of the plurality of media content.

8. The multimedia device as recited in claim 6, wherein the each of the first set of probabilistic values and second set of probabilistic values is based on a set of metadata attributes for each of the plurality of media content and one of the first set of parameters and the second set of parameter.

9. The multimedia device as recited in claim 6, wherein the set of metadata attributes is one or more from a group comprising static media content information, analytical media content information, usage media content information, user rated media content information, externally gathered media-content information, collaboratively filtered media-content information, and contextual media content information.

10. The multimedia device as recited in claim 1 further comprising:
    a metadata database, wherein the metadata database stores a set of metadata attributes of each of the plurality of media content; and
    a memory for storing the plurality of media content.

11. The multimedia device as recited in claim 1, wherein the output device comprises a display for displaying and providing access to one of the first list of media content and the second list of the media content.

12. The multimedia device as recited in claim 1, wherein the processor changes the second list of media content into the first list of media content, when the second set of parameter is changed to the first set of parameter.

13. A method for managing a multimedia device, the multimedia device storing a plurality of media content, the method comprising:
    receiving a first set of parameters associated with at least one metadata attribute from a user interface (UI) of the multimedia device, wherein the first set of parameters is received in terms of a position on a scale associated with the at least one metadata attribute, further wherein the at least one metadata attribute is objectively-based;
    creating a first list of media content from the plurality of media content based on a first probabilistic distribution over the plurality of media content, wherein the first probabilistic distribution is based only on the first set of parameters and the plurality of media content;
    providing access to a media content, wherein the media content is selected from the first list of media content;
    receiving a second set of parameters from the UI of the multimedia device while the multimedia device provides accesses to the media content; and
    creating a second list of media content from the plurality of media content based on a second probabilistic distribution over the plurality of media content, wherein the second probabilistic distribution is based only on the second set of parameters and the plurality of media content.

14. The method as recited in claim 13, wherein the first set of parameters and the second set of parameters are associated with a set of metadata attributes, wherein the set of metadata attributes is associated with each of the plurality of media content.

15. The method as recited in claim 14, wherein the set of metadata attributes is selected from the group comprising static media content information, analytical media content information, usage media content information, user rated media content information, externally gathered media content information, collaboratively filtered media content information, and contextual media content information.

16. The method as recited in claim 13 further comprising calculating one of the first probabilistic distribution and second probabilistic distribution over the plurality of media content.

17. The method as recited in claim 16, wherein calculating the first probabilistic distribution comprises computing a first set of probabilistic values for the plurality of media content, and wherein calculating the second probabilistic distribution comprises computing a second set of probabilistic values for the plurality of media content.

18. The method as recited in claim 17, wherein computing the first set of probabilistic values for each of the plurality of media content is based on the set of metadata attributes for each of the plurality of media content and the first set of parameters.

19. The method as recited in claim 17, wherein computing the second set of probabilistic values for each of the plurality of media content is based on the set of metadata attributes for each of the plurality of media content and the second set of parameters.

20. The method as recited in claim 17, wherein creating each of the first list of media content and the second list of media content further comprises:
   generating a set of pseudo-random numbers; and
   comparing the set of pseudo-random numbers and the one of the first set of probabilistic values and second set of probabilistic values of each of the plurality of media content.

21. The method as recited in claim 20 further comprising prior to creating the first list of media content receiving the first set of parameters.

22. The method as recited in claim 20 further comprising prior to creating the second list of media content receiving the second set of parameters.

23. The method as recited in claim 13, wherein the second list of media content is changed to the first list of media content when the second set of parameter is changed to the first set of parameter.

* * * * *